United States Patent [19]

Tedeschi

[11] Patent Number: 5,550,737
[45] Date of Patent: Aug. 27, 1996

[54] METHOD FOR ANALYSIS OF VEHICLE PERFORMANCE CHARACTERISTICS

[75] Inventor: Rinaldo Tedeschi, Newington, Conn.

[73] Assignee: Environmental Systems Products, Inc., East Granby, Conn.

[21] Appl. No.: 148,634

[22] Filed: Nov. 5, 1993

[51] Int. Cl.[6] ........................................ G01M 15/00
[52] U.S. Cl. ........................ 364/424.03; 364/431.01; 364/551.01; 73/23.31; 73/118.1
[58] Field of Search ................. 364/424.03, 424.04, 364/431.01, 431.04, 431.06, 550, 551.01; 73/116, 117, 117.1, 117.2, 117.3, 118.1, 23.31; 324/378, 379; 340/438, 439

[56] References Cited

U.S. PATENT DOCUMENTS

| | | | |
|---|---|---|---|
| 4,128,005 | 12/1978 | Arnston et al. | 364/431.01 |
| 4,171,637 | 10/1979 | Blanke | 364/431.01 |
| 4,328,546 | 5/1982 | Kreft et al. | 73/116 |
| 4,424,709 | 1/1984 | Meier, Jr. et al. | 364/431.04 |
| 5,034,893 | 7/1991 | Fisher | 364/431.01 |
| 5,105,651 | 4/1992 | Gutmann | 73/118.1 |
| 5,247,287 | 9/1993 | Jonker et al. | 364/431.04 |
| 5,363,091 | 11/1994 | Kotwicki et al. | 364/431.06 |
| 5,377,112 | 12/1994 | Brown, Jr. et al. | 364/424.03 |
| 5,431,042 | 7/1995 | Lambert et al. | 73/116 |

*Primary Examiner*—Gary Chin
*Attorney, Agent, or Firm*—Schweitzer Cornman & Gross

[57] ABSTRACT

A method for the analysis of performance characteristics of a vehicle includes the measuring of a plurality of performance variables over the course of a predefined test protocol, typically providing for the variation of operating parameters during the duration of the test. Each variable is compared to an appropriate reference at a chosen number of points or "test sites" during the test, and the results of each comparison is classified as being above, below or within tolerance. The comparison results are tabulated into a value matrix. The matrix is compared to a series of reference matrices, each of which is associated to a different cause, such as bad timing, fouled spark plug, poor cylinder compression, and the like. Association of the values in the matrix to a reference matrix allows the problem as reflected by the measured performance variable values to be identified.

9 Claims, 6 Drawing Sheets

FIG. 5

| SITE | COMPONENT | | | |
|---|---|---|---|---|
| | HC | CO | $CO_2$ | $NO_x$ |
| 1 | H | — | — | H |
| 2 | L | L | L | — |
| 3 | — | — | — | — |
| 4 | H | H | — | H |
| ⋮ | ⋮ | ⋮ | | |
| 9 | — | H | H | — |

| HC | CO | $O_2$ | $NO_x$ | INDEX NO. |
|---|---|---|---|---|
| H | H | H | H | 001 |
| H | H | H | — | 002 |
| H | H | H | L | 003 |
| H | H | — | H | 004 |
| H | H | L | H | 005 |
| H | H | — | — | 006 |
| H | H | — | L | 007 |
| ⋮ | | | | ⋮ |

FIG. 6

METHOD FOR ANALYSIS OF VEHICLE PERFORMANCE CHARACTERISTICS

The present invention relates to a method for effectuating an analysis of data obtained during the inspection of a motor vehicle.

BACKGROUND OF THE INVENTION

The testing of motor vehicles in accordance with requirements of the United States Environmental Protection Agency and state and local regulatory bodies requires a battery of tests to be performed, with the associated analysis of significant amounts of data. Often, this data is to be compared to limits or guidelines for determination as to whether or not the operating parameters of the vehicle fall within specification. While the use of automated data processing equipment, such as computers, has made the task of obtaining, processing and analyzing such data less burdensome, there remain test procedures which do not provide the needed analysis of data to fully identify potential problems.

For example, inspection and maintenance procedures mandated by the Environmental Protection Agency in response to the Clean Air Act of 1990 require an analysis of exhaust gases of motor vehicles, pursuant to procedure I/M240. The analysis is to include tailpipe testing in a manner which utilizes the use of an inertia flywheel dynamometer to reproduce road driving conditions for the vehicle under test. The emission levels of various exhaust components is measured as a variety of driving conditions is simulated. The overall emission of the components as a proportion of the total exhaust gases is then compared to a reference and a pass/fail decision reached. With sufficient resolution, out-of-specification vehicles can be identified effectively.

The failed vehicle is then typically scheduled for repair to bring the exhaust component readings into compliance. Since the test results often are only in the form of a pass/fail report, however, the mechanic is often ill-equipped to identify and locate the problem. Further testing is normally required.

Even in situations where the underlying data is made available to repair personnel, current methodologies and procedures are not adapted to allow a meaningful analysis to be made. The volume levels of the constituents alone usually provide scant clues as to the source of the problem. Further testing is normally still required.

It is accordingly the purpose of the present invention to provide a method for analysis of vehicle exhaust component test data and similar information in a manner which allows the repair mechanic to identify specific aspects of the test procedure results which do not conform to accepted standards, apply such discrepancies to isolate potential problems which would cause such results, and to allow identification of likely solutions to correct the failure resulting in the recorded results.

BRIEF DESCRIPTION OF THE INVENTION

In accordance with the above and other purposes and objects, the method of the present invention encompasses the recordation of test data, typically for each of a plurality of monitored variables, over the course of a test protocol. In a preferred embodiment, the variables are exhaust gas component concentrations. A similar record for each variable over the course of the test for an in-specification vehicle is prepared.

A series of reference intervals or points are identified over the duration of the test for each variable, and the actual results are compared to the reference results at each point or interval for each variable. The comparison may be performed visually, with test and reference results for a variable expressed graphically and superimposed upon each other.

The relationship between actual and reference values at each reference location is then determined for each variable. By use of an appropriate scoring system, the differences are identified, tabulated and compared to a predetermined listing, whereby a recommended solution to the problem suggested by the matrix can be found.

BRIEF DESCRIPTION OF THE DRAWINGS

A fuller understanding of the present invention can be obtained upon consideration of the following detailed description of preferred, but nonetheless illustrative embodiments of the invention when considered in conjunction with the annexed drawings, wherein:

FIG. 5 is a representation of a correspondence matrix;

FIG. 6 is a representation of an index matrix to facilitate association between test data and reference data;

DETAILED DESCRIPTION OF THE INVENTION

Analysis of the gas constituents of vehicle exhausts indicates that the concentrations of such constituents vary with engine operating parameters. Such parameters include both engine speed, as well as other operating indicia, including the condition of the engine. The presence of nitrogen oxides, for example, is related to the degree of combustion, which in turn is dependent upon the state of tune of the engine. An improperly tuned engine can emit significantly greater levels of such oxides than a properly tuned engine.

Figure 1:
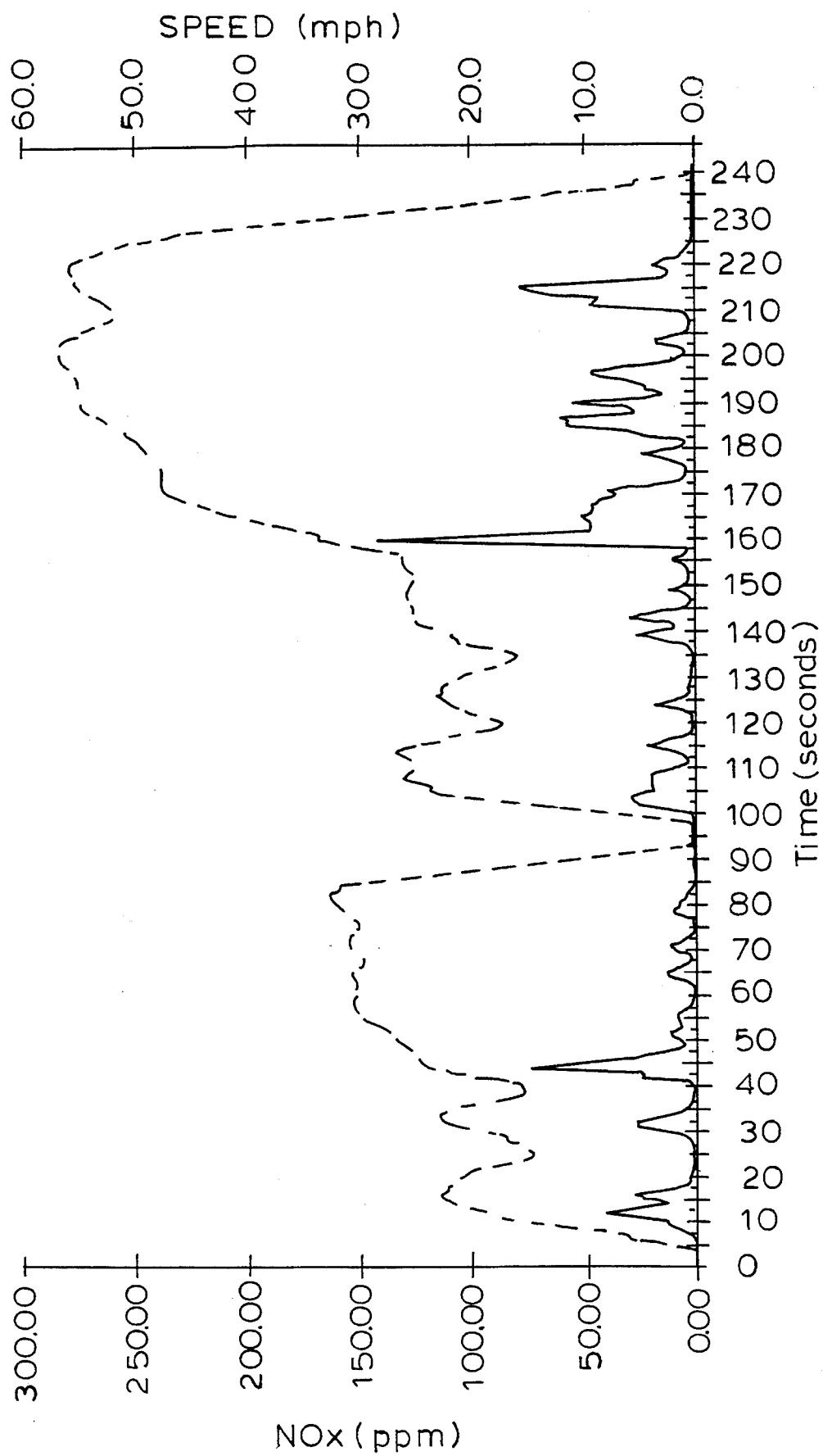
FIG. 1 is a graphical representation of a typical analysis plot of an exhaust gas component for a property tuned and operating vehicle.

FIG. 1 depicts a representative "signature" plot of the concentration of nitrogen oxides in the exhaust gas of a vehicle, measured at the tailpipe over the course of a dynamometer-controlled test of a properly-tuned vehicle. Such a plot may be generated by a known gas analyzer configured to measure the particular component of interest. During the course of the test, which is presented as the ordinate to the graph in seconds, engine operation at a variety of speeds is effected as known in the art. A plot of the simulated speed of the vehicle during the test is also shown as broken-line plot. The test protocol may be that of I/M240, although it is to be recognized that other protocols can be utilized as may be suggested by the component to be measured and its relationship to various vehicle operating conditions. The total volume of the component, collected over the course of the test, and without regard to the instantaneous variation of concentration, is used in conventional analyses to establish a reference value for comparison purposes. It can be appreciated that, even in a properly tuned and operating vehicle, the concentration of such a constituent varies significantly over the course of a test and thus a given total volume may in fact reflect a variety of different signatures. A similar plot is generated for the vehicle under test.

Figure 2:
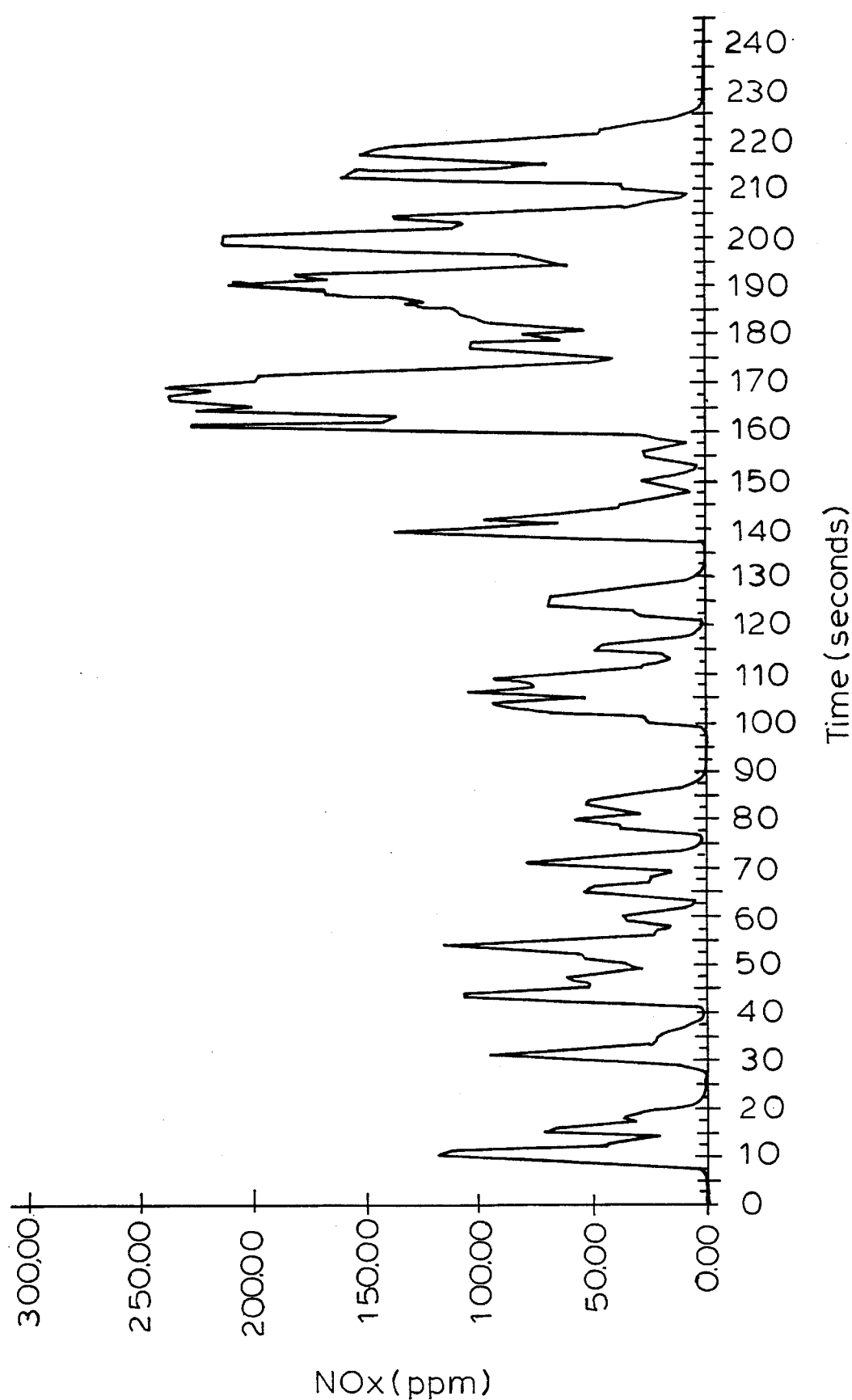
FIG. 2 is a graphical presentation of the plot of the component for the vehicle with a blocked EGR valve.

FIG. 2 depicts the result of an identical exhaust gas constituent measurement performed an identical vehicle having a blocked EGR valve. The trace is clearly different from that of FIG. 1. While the total volume is different from that of the reference, the difference does not, by itself, easily permit the underlying problem resulting in the difference to be determined.

Figure 3:
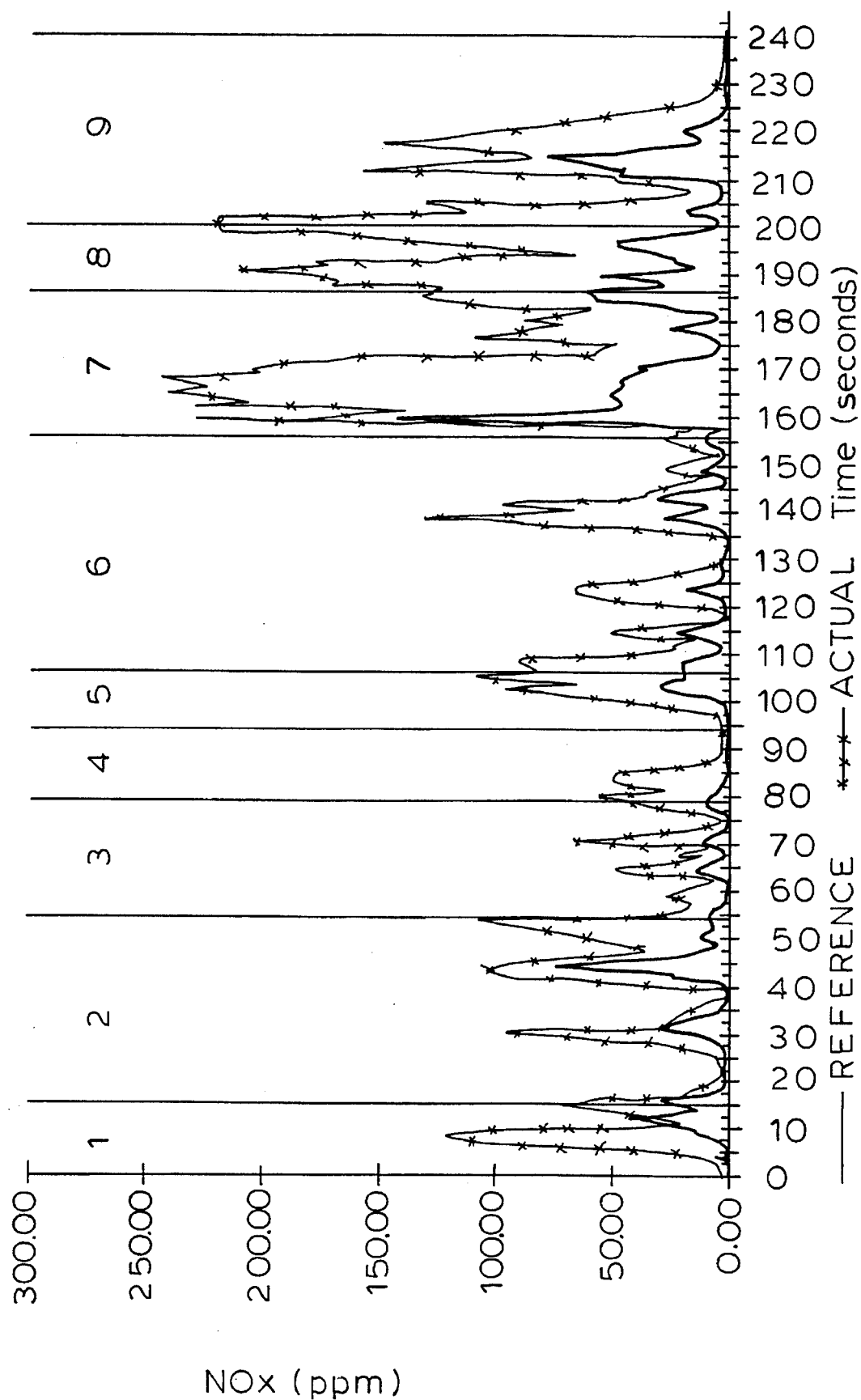
FIG. 3 is the juxtaposition of the graphical representations of FIGS. 1 and 2.

Accordingly, and in further accordance with the present invention, instantaneous concentration data measured over the course of the test is utilized for analysis. To facilitate such analysis, a series of reference points or intervals are chosen as test sites for comparison purposes between actual and reference values. As shown in FIG. 3, nine intervals have been identified, corresponding to differing portions of the test protocol which in turn may correspond, for example, to acceleration, constant speed, or deceleration intervals. Those skilled in the art can choose points or intervals with proper consideration of the significance of the portion of the test protocol associated therewith upon the variable measured and the performance characteristics of the engine.

Figure 4:
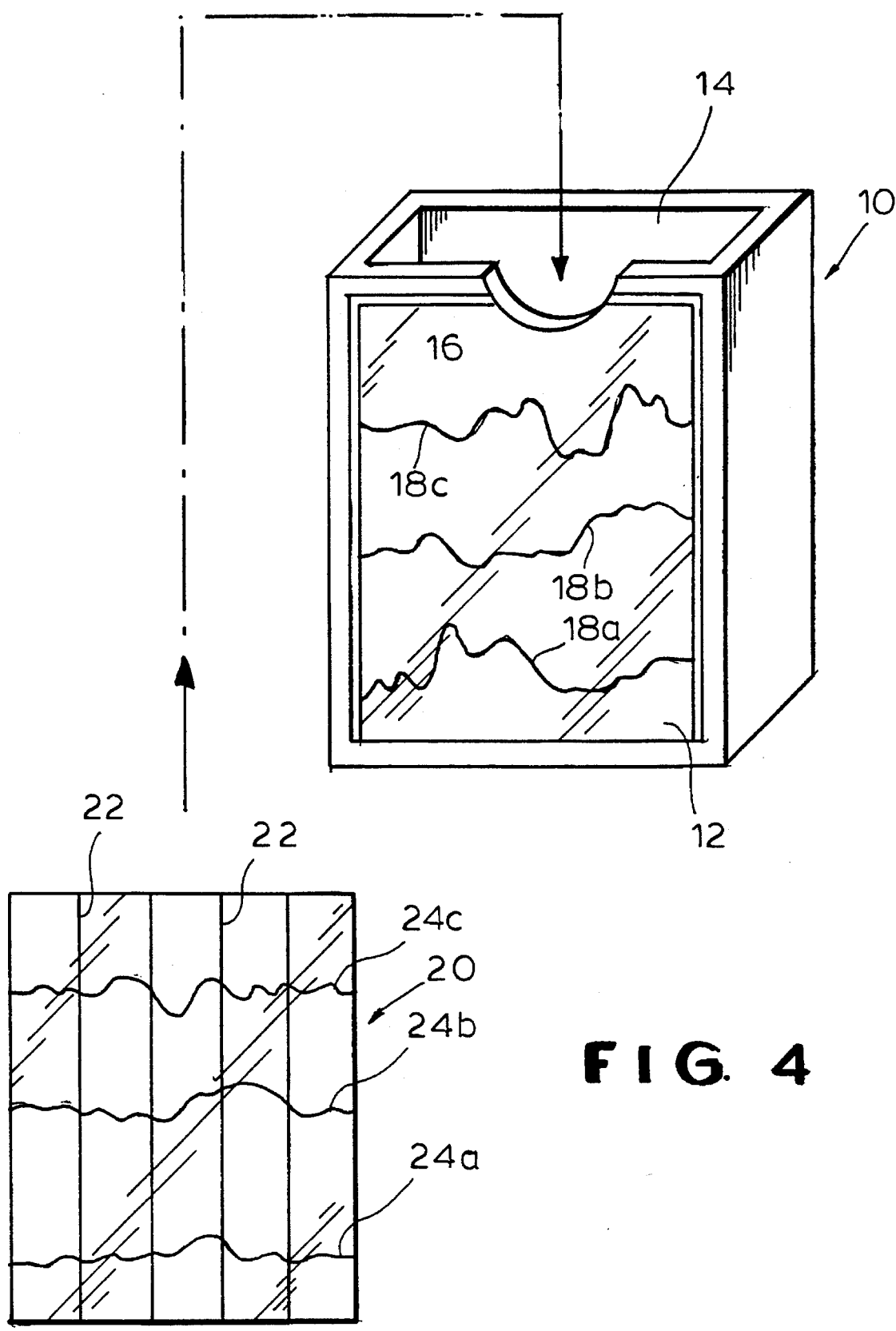
FIG. 4 is a representation of a form of viewer for the graphical representations of FIGS. 1 and 2.

In a preferred embodiment of the invention, adapted for manual execution, reference data is presented in a graphical format, such as depicted in FIG. 1, with the test sites set out thereon and is positioned in an appropriate viewer or display box 10 such as depicted in FIG. 4. The viewer, which may be constructed of plastic or like material, has a clear front face and an open top 14.

A corresponding test trace sheet 12 to be analyzed is placed in the viewer. The reference trace, preferably reproduced on a transparent film 20 at the same scale as the test trace, and including the test site markings 22, is placed in the viewer as an overlay to the test trace. Preferably, test traces for a plurality of component tests, as presented in the Figure at 18a, b, and c are placed on the single sheet 12, with the transparent overlay 20 having the respective reference traces 24a, b, and c with common interval markings 22. Correspondence and deviation between each of the respective pairs of plots can thus be easily observed.

An analysis and notation of the relationship between the test and reference plots for each reference point or interval is then performed. Such notation may be in the form of an indication that test results are either higher, lower, or equivalent to the reference. Such review is conducted at each test site and for each constituent or variable to be analyzed. With respect to the analysis of exhaust gases, the concentrations of four constituents, HC, CO, $CO_2$, and $NO_x$ can provide meaningful data to diagnose a variety of engine malfunctions.

The analysis of each component is then preferably utilized to generate a matrix of values as shown in FIG. 5, each row identifying a test site and each column identifying a different constituent. As shown in the Figure, test values are recorded as being in one of three comparison zones: above (H), below (L), or equal (-) to the reference value. In constructing the reference plots, it may be preferable to present the reference traces as a band of values, rather than as a line, to define a zone of values for the variable which are to be considered "normal". The band can either be of fixed or variable width, as suggested to those skilled in the art by the nature of the variable plotted. The resulting matrix of FIG. 5, describing the test results, is compared to a reference volume in which known combinations of comparison values for the variables or constituents are associated with identified problems and suggested solutions.

In order to further facilitate the comparison with the reference, the various possible outcomes for each constituent at each test site or interval can be presented in the form of an index matrix as set forth in FIG. 6. As depicted therein, each possible combination of test results (high, low and normal) for each test site is be identified with an index number. The collection of index numbers (representing the results at each test site) is then used, in conjunction with a similarly keyed appropriate reference volume.

It is to be recognized that the universe of possible index numbers is, in theory, quite large, as it references three values for each variable. For a given make and model of vehicle, however, there will exist a given subset of values which will correspond to all expected causes of non-specification conditions. It is thus possible to provide index matrices which only encompass such possible combinations, facilitating use and identification of the appropriate index number.

Figure 7:
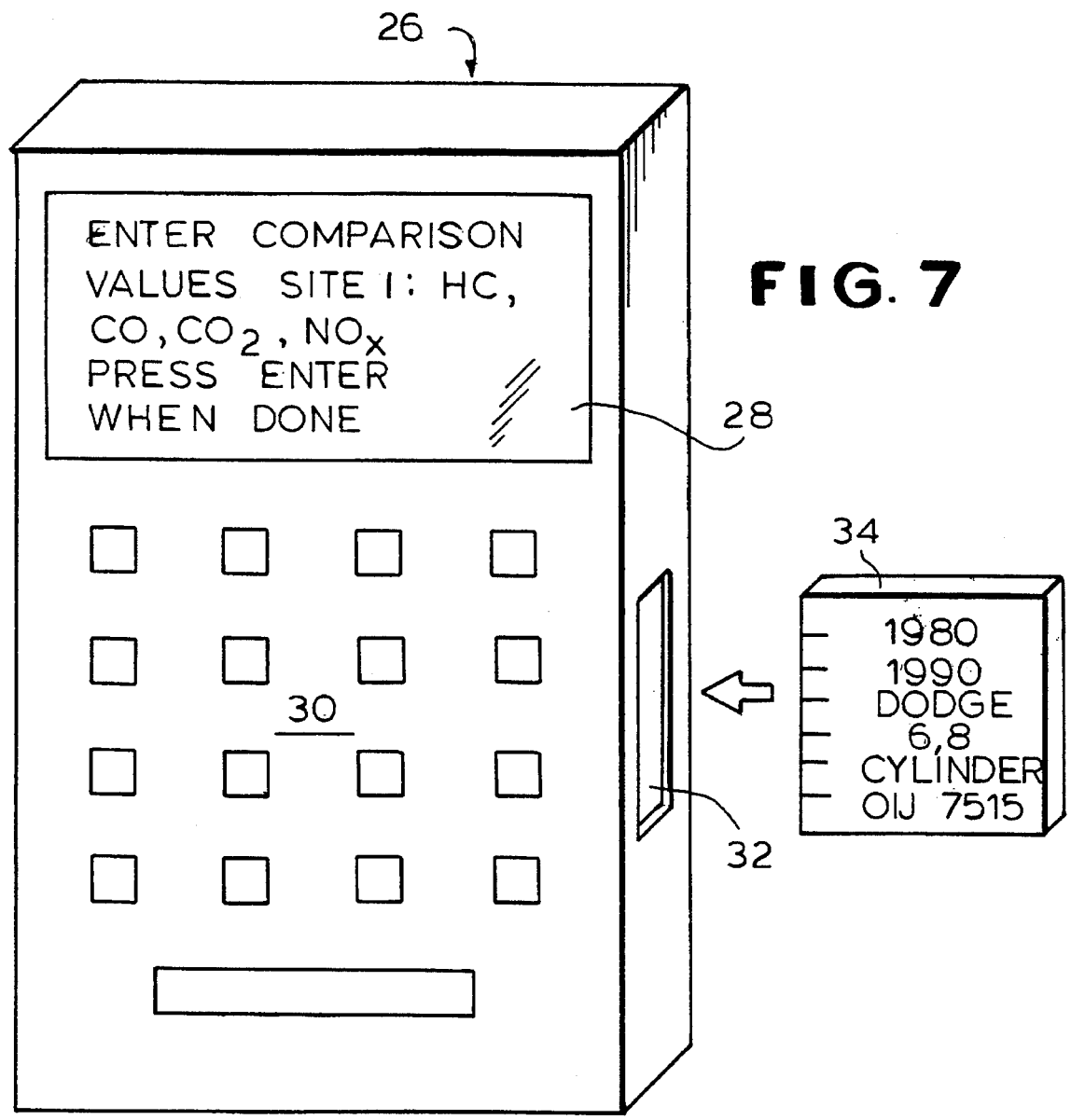
FIG. 7 is an illustration of a hand-held calculator usable in connection with the present invention.

As an alternative to a manual process, a suitable microprocessor system can be provided to replace the tabulation and look-up steps. FIG. 7 depicts hand-held calculator-type unit 26, with a display screen 28 and data entry keyboard 30, which includes a slot 32 which accepts interchangeable pre-programmed card module 34 bearing appropriate data for one or more vehicle makes, models, and/or years as appropriate, and establishes electrical contact between the card and the processor of the calculation.

Once a manual correspondence between actual and reference test data is performed, vehicle data is entered through the keyboard as requested, and the mechanic is prompted for entry of deviation data (high, low or normal) for the variables for each test site. With such data entered the calculator performs the appropriate procedures equivalent to a manual look-up to identify one or more problems and solutions best fitting the inputted data. The problems and solutions can be displayed directly, or may be displayed as code numbers to be referenced to a repair volume.

Figure 8:
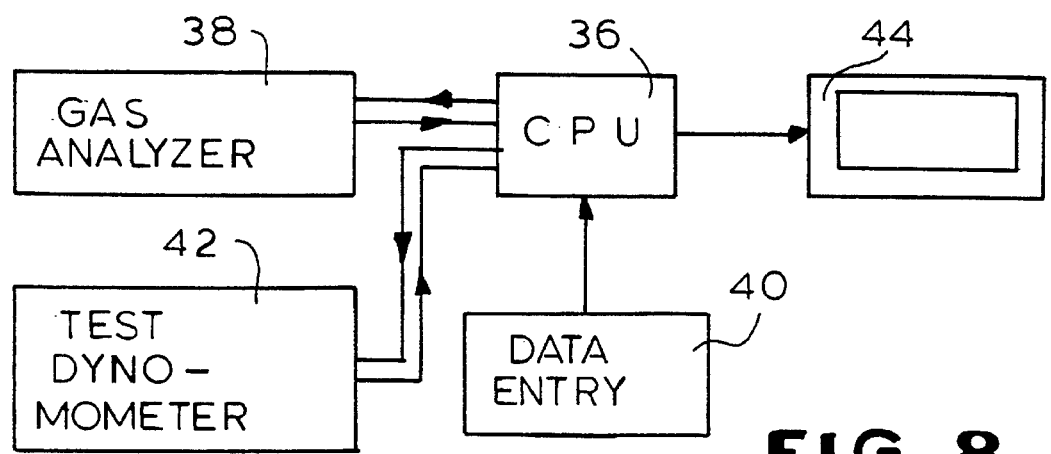
FIG. 8 is a block diagram of an automated system for carrying out the invention.

All manual steps may be eliminated by a fully automated system capable of carrying out the present invention as presented in FIG. 8. Central data processing unit 36, which may preferably be a pc-type processor as typically utilized in conjunction with automated vehicle testing systems, is coupled to receive the real time concentration data generated by analyzer 38. The processor is typically provided with a data entry terminal 40, such as a keyboard, through which vehicle information is entered. This information is provided at the commencement of a test routine, which can include both the analysis of the present invention as well as other performance tests as known in the art. The processor may also be coupled to a dynamometer 42, both for control thereof and to monitor the progress of the test.

Using a "time into test" reference time base, the received concentration data is stored and segregated or divided into appropriate time intervals corresponding to the established test sites. Appropriate integration or averaging of data values over a chosen interval may be performed to provide a single value representative of the measurement across the interval. Alternatively, the values at a predetermined set of times may be specifically identified. Corresponding reference concentration data, stored in the processor's associated memory, is accessed for comparison.

The test and reference data may be simultaneously displayed on monitor 44. If manual analysis is desired, the display may include appropriate depiction of the test site indicia. Either actual or integrated/average readings may be presented.

Preferably, however, processor 36 is utilized to perform a complete analysis, including the comparison between actual and reference test data at each test site. The computing power of such apparatus can be utilized to provide for a statistical analysis of the data to facilitate the determination as to whether or not the test reading is to be deemed in or out of spec. Again, integration and/or averaging of instantaneous readings across the width of an interval test site may be utilized by appropriate statistical algorithms in making such a determination.

The system then generates an appropriate tabulation, which again may be displayed on the monitor or, preferably, compared by the processor to stored data to identify likely causes and solutions. Such information may be displayed on the monitor or generated in a printout for reference by the mechanic.

While described in conjunction with the analysis of vehicle exhaust data, it is to be appreciated that the present invention may have applicability in other situations where a plurality of variables, measured over the course of a test protocol are to be analyzed to determine the cause of such results.

I claim:

1. A method for the analysis of vehicle performance data for a vehicle under test, comprising the steps of:
    a) measuring the concentration of a plurality of exhaust constituents over the course of a test protocol;
    b) identifying a plurality of test intervals during the duration of said test protocol and determining the concentration of each of said constituents thereat;
    c) creating a graph of concentration value over the course of said test protocol for each constituent;
    d) creating a corresponding graph of reference concentration value over the course of said test protocol for each constituent;
    e) comparing the value of each constituent graph and its corresponding reference graph value at each of said test intervals;
    f) classifying the result of each comparison into one of a plurality of comparison zones;
    g) creating an array of said classifying results; and
    h) comparing said array to a reference to determine the vehicle performance.

2. The method of claim 1, wherein said comparison zones comprise normal, above, and below normal zones.

3. The method of claim 1, wherein said array is a matrix of classifications for each variable on a test interval by test interval basis.

4. The method of claim 1, wherein said step of comparing the value of each constituent graph and its corresponding reference graph comprises the step of aligning said constituent graph and said corresponding reference graph in juxtaposition with each other.

5. The method of claim 1, wherein said aligning step comprises the step of inserting said constituent and reference graphs in a holder adapted to maintain said graphs in juxtaposition during comparison.

6. The method of claim 1, wherein each of said constituent graphs and each of said reference graphs for said constituents are arrayed on a common substrate.

7. The method of claim 5, wherein said steps of creating constituent graphs and reference graphs include the step of placing test interval indicia on at least one of the arrays of said constituent graphs and reference graphs.

8. The method of claim 1, wherein said steps of creating an array and comparing said array are performed by an automated processor, said processor having means for the manual input of classification data and the display of the results of said array.

9. The method of claim 1, wherein said concentration measuring step comprises simulating vehicle operation at a variety of operating conditions.

\* \* \* \* \*